United States Patent
Saito

(10) Patent No.: US 8,594,886 B2
(45) Date of Patent: Nov. 26, 2013

(54) CAR-MOUNTED INFORMATION APPARATUS AND INFORMATION TRANSFER SYSTEM FOR ELECTRIC CAR

(75) Inventor: Shingo Saito, Nerima (JP)

(73) Assignee: Pioneer Corporation, Kanagawa (JP)

( * ) Notice: Subject to any disclaimer, the term of this patent is extended or adjusted under 35 U.S.C. 154(b) by 113 days.

(21) Appl. No.: 13/140,739

(22) PCT Filed: Sep. 10, 2009

(86) PCT No.: PCT/JP2009/065821
§ 371 (c)(1),
(2), (4) Date: Jun. 17, 2011

(87) PCT Pub. No.: WO2010/070954
PCT Pub. Date: Jun. 24, 2010

(65) Prior Publication Data
US 2011/0251753 A1    Oct. 13, 2011

(30) Foreign Application Priority Data

Dec. 19, 2008  (WO) .................. PCT/JP2008/073171

(51) Int. Cl.
*G06F 7/00* (2006.01)
*G05D 1/00* (2006.01)
*B60K 1/00* (2006.01)
*B60L 1/00* (2006.01)

(52) U.S. Cl.
USPC ................. 701/36; 701/1; 180/65.1; 307/10.1

(58) Field of Classification Search
USPC ........... 701/1, 36; 180/65.1, 65.125; 307/10.1
See application file for complete search history.

(56) References Cited

U.S. PATENT DOCUMENTS

| | | | | |
|---|---|---|---|---|
| 5,650,710 | A * | 7/1997 | Hotta | 320/128 |
| 6,242,873 | B1 * | 6/2001 | Drozdz et al. | 318/139 |
| 6,424,157 | B1 * | 7/2002 | Gollomp et al. | 324/430 |
| 6,555,991 | B1 * | 4/2003 | Zettel et al. | 320/137 |
| 6,909,200 | B2 * | 6/2005 | Bouchon | 307/10.1 |
| 7,184,866 | B2 * | 2/2007 | Squires et al. | 701/29.3 |
| 2004/0235537 | A1 * | 11/2004 | Koga et al. | 455/574 |
| 2006/0047374 | A1 * | 3/2006 | Hashimoto et al. | 701/1 |
| 2006/0080034 | A1 * | 4/2006 | Hayashi | 701/211 |
| 2007/0120554 | A1 * | 5/2007 | Kawakami et al. | 324/133 |
| 2007/0260569 | A1 * | 11/2007 | Biger et al. | 706/47 |

FOREIGN PATENT DOCUMENTS

| | | | | |
|---|---|---|---|---|
| EP | 1 992 524 A1 | 11/2008 | | |
| JP | 07031072 A | 1/1995 | | |
| JP | 2002-005669 A | 1/2002 | | |
| JP | 2002005669 A | * | 1/2002 | ............. G01C 21/00 |

(Continued)

*Primary Examiner* — Thomas Black
*Assistant Examiner* — Tyler Paige
(74) *Attorney, Agent, or Firm* — Sughrue Mion, PLLC

(57) ABSTRACT

To securely prevent from battery depletion and enable transfer data without troubling a user, a communication address data storage unit stores a communication address datum such as an IP address, a telephone number of the predetermined information management apparatus arranged outside an electric car. When an accessory switch of the electric car is in OFF state, it is judged by a charge state judge unit whether or not the battery is in charging. When it is judged by the charge state judge unit that the battery is in charging, a control unit controls a radio communication unit to execute at least one action of transmitting updatable data and receiving update data for updating the updatable data between the information management apparatus. As a result, the car-mounted information apparatus can communicate by radio with the information management apparatus outside the electric car while the battery is in charging.

6 Claims, 8 Drawing Sheets

(56) References Cited

FOREIGN PATENT DOCUMENTS

| | | | | |
|---|---|---|---|---|
| JP | 2003047161 A | | 2/2003 | |
| JP | 2004096973 A | | 3/2004 | |
| JP | 2004-350013 A | | 12/2004 | |
| JP | 2004350013 A | * | 12/2004 | ............ H04M 1/725 |
| JP | 2006-010495 A | | 1/2006 | |
| JP | 2006010495 A | * | 1/2006 | |
| JP | 2006074867 A | | 3/2006 | |
| JP | 2007-230520 A | | 9/2007 | |
| JP | 2007230520 A | * | 9/2007 | |
| JP | 2007253868 A | | 10/2007 | |
| JP | 2007-322182 A | | 12/2007 | |
| JP | 2007322182 A | * | 12/2007 | |

* cited by examiner

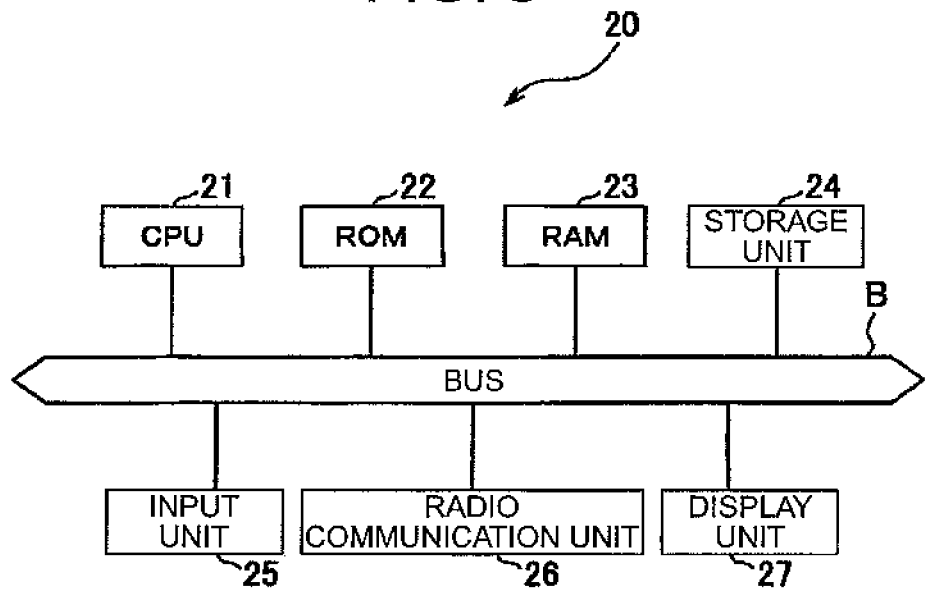

| DATA TRANSFER DIRECTION | DATA ITEM |
|---|---|
| TO NAVI | UPDATE DATA TO LATEST MAP |
| TO NAVI | REGISTERED POINT DATA |
| TO NAVI | ROUTE PLAN DATA |
| TO NAVI | MUSIC CONTENT DATA |
| TO NAVI | IMAGE CONTENT DATA |
| TO NAVI | TELEPHONE NUMBER DATA |
| TO PC | TRAVELING TRACK DATA |
| TO PC | REGISTERED POINT DATA |
| TO PC | ROUTE PLAN DATA |
| TO PC | TELEPHONE NUMBER DATA |
| TO PC | FUEL LEVEL DATA |
| TO PC | CHARGED LEVEL DATA |
| TO PC | FUEL EFFICIENCY DATA |

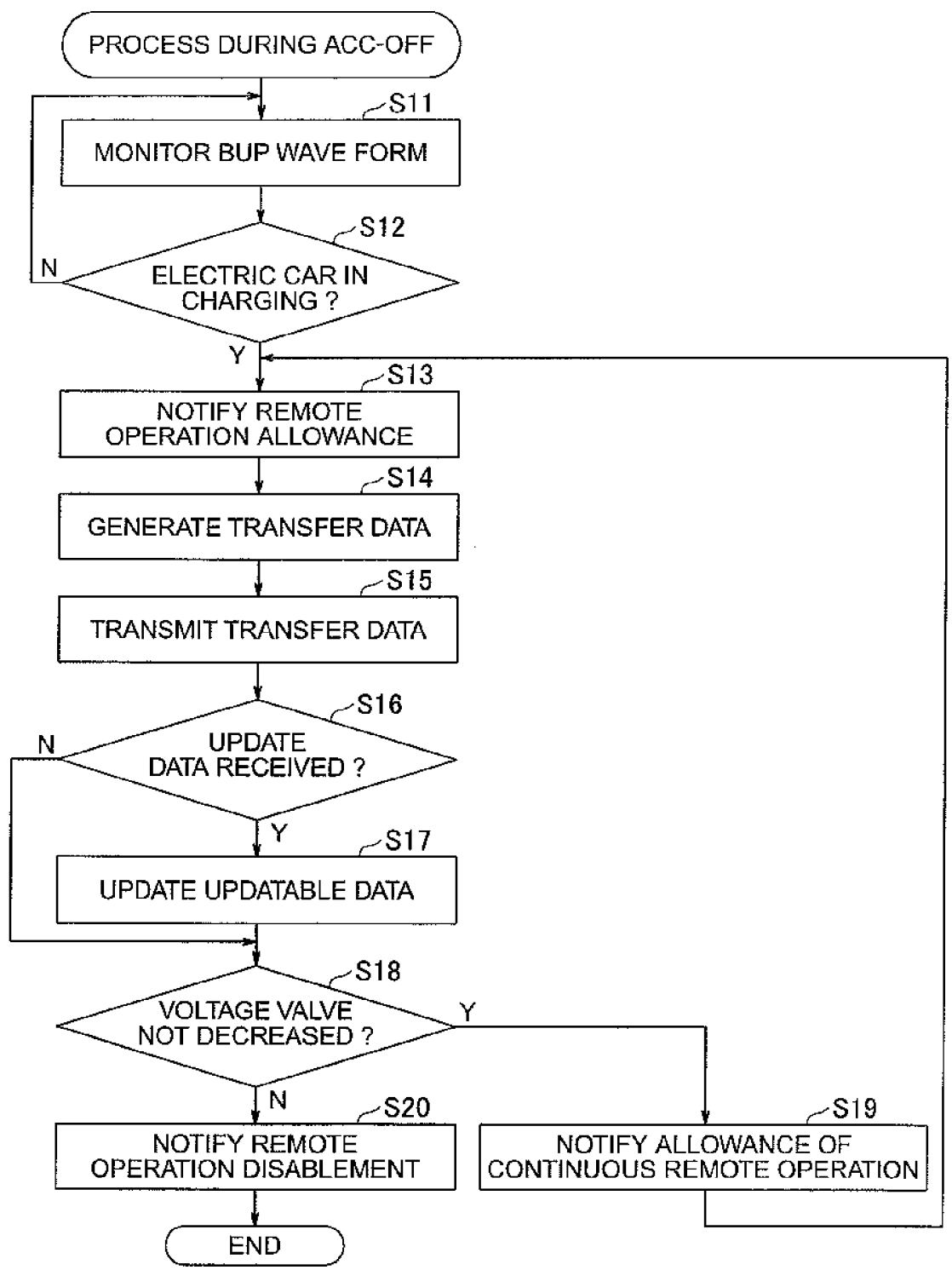

CAR-MOUNTED INFORMATION APPARATUS AND INFORMATION TRANSFER SYSTEM FOR ELECTRIC CAR

CROSS REFERENCE TO RELATED APPLICATIONS

This application is a National Stage of International Application No. PCT/JP2009/065821 filed Sep. 10, 2009, claiming priority based on WO Patent Application No. PCT/JP2008/073171 filed Dec. 19, 2008, the contents of all of which are incorporated herein by reference in their entirety.

FIELD OF THE INVENTION

This invention relates to a car-mounted information apparatus, such as a car navigation apparatus and a car audio apparatus, which is mounted at an electric car, and an information transfer system for an electric car having the car-mounted information apparatus.

BACKGROUND OF THE INVENTION

Description of the Background Art

In a conventional car navigation apparatus, processing time of one or two hours is required for renewing all map data or updating the map data having many update data. Therefore, some of the conventional car navigation apparatuses have a storage medium storing the map data, which storage medium is removable from the car navigation unit, or other some of the conventional car navigation apparatuses are designed to be detachable from the car body. Thereby, a user usually brings the removable storage medium back to home and updates the map data in the removable storage medium through a personal computer (PC) in a condition of stably supplying electric power.

Other conventional car navigation unit receives update map data through a communication network and updates the map data stored in a built-in storage medium based on the update map data as shown Patent Document 1. Therefore, action by the user bringing the removable storage medium or the apparatus itself back to home is eliminated.

CITATION LIST

Patent Document 1: Japan Patent Publication Application 2002-5669

SUMMARY OF THE INVENTION

Objects to be Solved

In the car navigation apparatus described in the Patent Document 1, update process can not be acted during use of the car navigation apparatus by the user, so that the update process must be acted when the car returns home. In case, the car navigation device has to be activated by electric power from a battery of the car, and it is troublesome that the car must be under an idle running. In addition, when update process of map data or transferring the map data requires much time, it is afraid that battery depletion of the car would occur. The battery depletion of the car may occur not only by the car navigation apparatus but also various information apparatuses such as a car audio apparatus, a monitor apparatus, an ETC apparatus (electronic toll collection system) and the like.

Improving added value of the car-mounted information apparatus by sharing information between the car-mounted information apparatus and a personal computer at home or an office is discussed. However, it is difficult to supply such function because of the battery depletion. An object of the present invention is exampled by solving the above problem.

According to the above problems, an object of the present invention is to provide a car-mounted information apparatus which can transfer information data without a troublesome action for a user while preventing securely from battery depletion of an electric car, and an information transfer system for electric car.

How to Attain the Object of the Present Invention

In order to overcome the above problems and attain the object of the present invention, a car-mounted information apparatus according to the present invention is acted by electric power supplied from a battery of an electric car, and includes an updatable data storage unit storing updatable data; a communication address data storage unit storing a communication address datum corresponding a predetermined information management apparatus arranged outside the electric car; a charge state judge unit judging whether or not the battery is in charging when an accessory switch of the electric car is in OFF state; a radio communication unit communicating between the information management apparatus, to which the communication address datum corresponds, by the electric power supplied from the battery in charging; and a control unit controlling the radio communication unit to execute at least one action of transmitting the updatable data and receiving update data for updating the updatable data between the information management apparatus when the charge state judge unit judges that the battery is in charging.

In order to overcome the above problems and attain the object of the present invention, an information transfer system for electric car according to the present invention includes the car-mounted information apparatus, and the information management apparatus arranged outside the electric car, and the information management apparatus includes an outside radio communication unit communicating between the radio communication unit of the car-mounted information apparatus, and an outside control unit controlling the outside radio communication unit to execute at least one action of receiving the updatable data and transmitting the update data between the car-mounted information apparatus.

The above and other objects and features of this invention will become more apparent from the following description taken in conjunction with the accompanying drawings.

BRIEF DESCRIPTION OF THE DRAWINGS

FIG. 5 is a block diagram showing an outline of the information management apparatus in FIG. 3;

FIG. 6 is a table showing an example of data transfer according to the information transfer system fro electric car;

FIG. 7 is a flowchart showing processes during ACC-Off executed by a control unit of the navigation apparatus in FIG. 4;

DESCRIPTION OF MARKINGS

Figure 1:
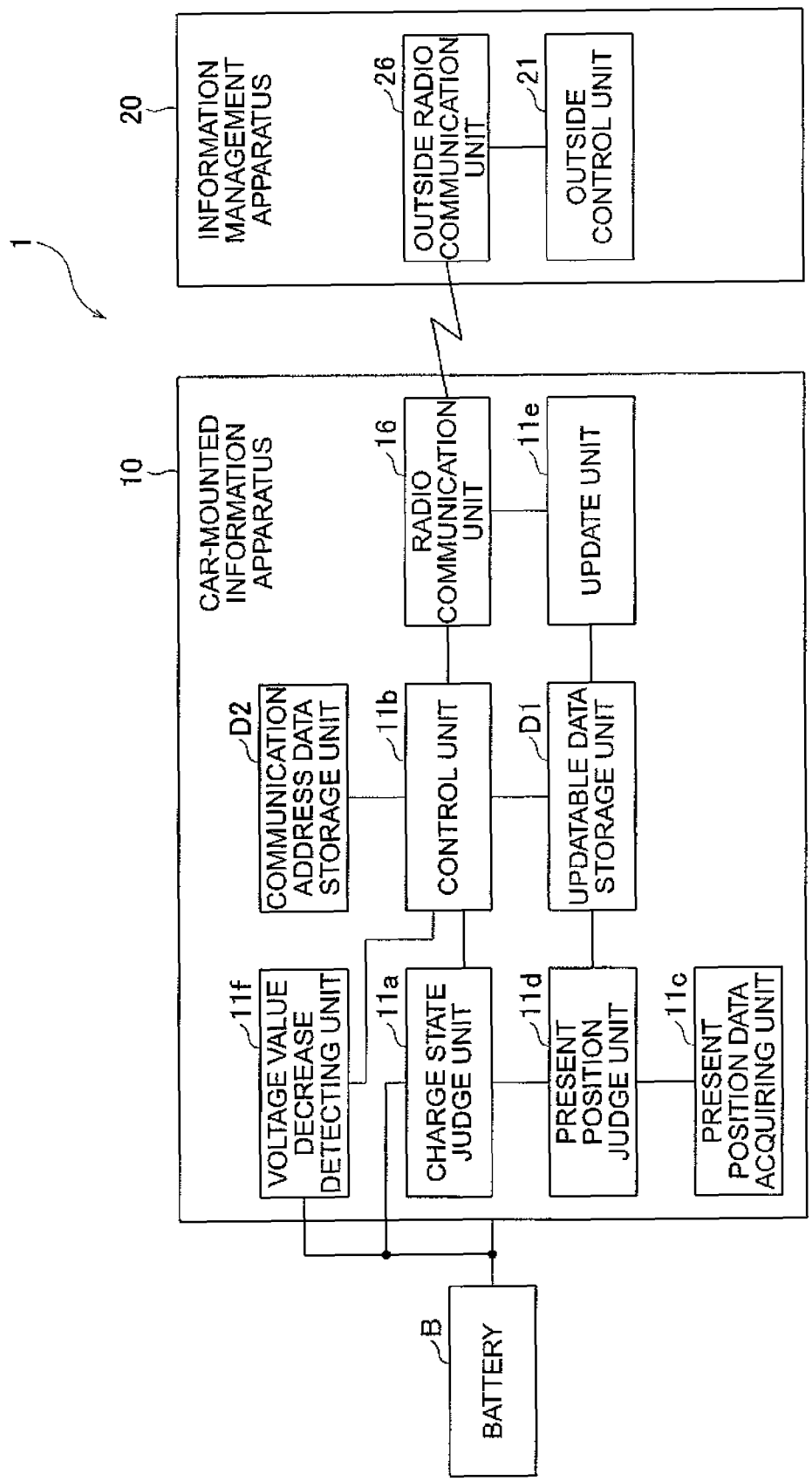
FIG. 1 is a block diagram of a car-mounted information apparatus and an information transfer system for electric car according to the present invention.

1. Information transfer system for electric car
2. Electric car
3. Accessory (ACC) switch
4. Electric power receiving plug
10. Car-mounted information apparatus (navigation apparatus)
11a. Charge state judge unit (control unit)
11b. Control unit (control unit)
11c. Present position data acquiring unit (control unit)
11d. Present position judge unit (control unit)
11e. Update unit (control unit)
11f. Voltage value decrease detecting unit (control unit)
16. Radio communication unit
20. Information management apparatus
21. Outside control unit (CPU)
26. Outside radio communication unit
D1. Updatable data storage unit
D2. Communication address data storage unit

DESCRIPTION OF THE PREFERRED EMBODIMENT

An embodiment of a car-mounted information apparatus and an information transfer system for electric car according to the present invention will be described with reference to a basic block diagram shown in FIG. 1.

The car-mounted information apparatus 10 shown in FIG. 1 is acted by electric power supplied from a battery B of an electric car, and includes a updatable data storage unit D1 storing updatable data; a communication address data storage unit D2 storing communication address datum corresponding a predetermined information management apparatus 20 arranged outside the electric car; a charge state judge unit 11a judging whether or not the battery B is in charging when an accessory switch of the electric car is in OFF state; a radio communication unit 16 communicating between the information management apparatus 20, to which the communication address datum correspond, by the electric power supplied from the battery B in charging; and a control unit 11a controlling the radio communication unit 16 to execute at least one action of transmitting the updatable data and receiving update data for updating the updatable data between the information management apparatus 20 when the charge state judge unit judges that the battery is in charging.

According to the car-mounted information apparatus 10, the communication address data storage unit D2 stores a communication address datum including an IP address and a telephone number of the predetermined information management apparatus 20 arranged at an outside of the electric car. When the accessory (ACC) switch of the electric car is in OFF state, it is judged by the charge state judge unit 11a whether or not the battery B is in charging. When it is judged by the charge state judge unit 11a that the battery B is in charging, the control unit 11b controls the radio communication unit 16 to execute at least one action of transmitting the updatable data and receiving update data for updating the updatable data between the information management apparatus 20. Thereby, the car-mounted information apparatus 10 can execute at least one action of transmitting the updatable data and receiving update data for updating the updatable data between the information management apparatus 20 arranged outside the electric car by radio communication during charging the battery.

Thus, in the car-mounted information apparatus 10, the radio communication between the information management apparatus when the ACC switch is in OFF state is executed during charging the battery. Thereby, electric power consumption of the battery B can be prevented or held to a minimum, so that when communicating by radio is acted in many hours, battery depletion of the electric car can be securely prevented. Only by starting charging the electric car after turning the ACC switch to OFF, updating the updatable data of the car-mounted information apparatus 10 and backup of data can be automatically executed without a driver staying in the electric car. Thus, the car-mounted information apparatus 10 can share the updatable data with the information management apparatus arranged outside the electric car, so that the car-mounted information apparatus 10 can be used more effectively and usability of the car-mounted information apparatus 10 can be improved. By use of radio communication, only the information management apparatus having ability of radio communication may be provided outside the electric car for this system, and it is not required that specific infrastructure is prepared and built at a usual house, a public facility, so that the present invention can be applied easily.

The above-mentioned car-mounted information apparatus 10 furthermore includes a present position data acquiring unit 11c acquiring a present position data of the electric car, and a present position judge unit 11d judging whether or not the present position data acquired by the present position acquiring unit 11c corresponds to a radio communicatable position in which the car-mounted information apparatus 10 can communicate by radio with the information management apparatus 20; and the charge state judge unit 11a may judge whether or not the battery is in charging when it is judged by the present position judge unit 11d that the car-mounted information apparatus 10 is positioned at the radio communicatable position.

According to such car-mounted information apparatus 10, when the present position data acquiring unit 11c acquires the present position data, the present position judge unit 11d judges whether or not the present position data corresponds to the radio communicatable position in which the car-mounted information apparatus 10 can communicate by radio with the information management apparatus 20. When it is judged that the present position data corresponds to the radio communicatable position, the charge state judge unit 11a is enabled to judge whether or not the electric car is in charging.

In the above-mentioned car-mounted information apparatus 10, by adding a judge condition of the radio communicatable position about the information management apparatus, that is by judging in judge conditions of the radio communicatable position and charging, judge accuracy of judging whether or not the electric car is in charging can be improved. When the charging is judged based in a voltage value at a terminal of the battery, by limiting the radio communicatable position corresponding to a position which external electric power can be stably supplied, the judge accuracy can be more improved. It can be designed that no automatic update is executed when the present position is not the radio communicatable position, and automatic update is executed only when the present position is the radio communicatable position, so that when the car-mounted information apparatus 10 is frequently positioned able to charge the battery, much frequent automatic update can be prevented. Thus, by improving the judge accuracy whether or not in charging, the battery depletion of the electric car caused by update operation can be more securely prevented.

The above-mentioned car-mounted information apparatus 10 includes an update unit 11e acted by electric power supplied from the battery B in charging, and updating the updatable data based on the update data received through the radio communication unit 16.

In the above-mentioned car-mounted information apparatus 10, the update unit 11e updates updatable data at the updatable data storage unit D1 based on update data when the radio communication unit 16 receives the update data. Thereby, update time for updating the updatable data is added to transfer time for transferring data. This operation by the update unit 11e is executed during charging the battery, and the battery of the electric car is not discharged, so that the battery depletion of the electric car can be securely prevented during updating the updatable data. Therefore, the usability of the car-mounted information apparatus 10 can be more improved.

In above-mentioned car-mounted information apparatus 10, the charge state judge unit 11a is structured to analyze change of voltage value at the terminal of the battery B, and to judge, based on a result of analyzing, whether or not the battery B is in charging. According to the judge of charging by the charge state judge unit 11a, the radio communication unit 16 can communicate by radio between the information management apparatus 20 shown by the communication address datum.

In the above-mentioned car-mounted information apparatus 10, the charge state judge unit 11a analyzes the change of voltage value at the terminal of the battery B, and when it is judged, based on a result of analyzing, that the battery B is in charging, the radio communication unit 16 is enabled to communicate by radio with the predetermined information management apparatus 20. Thereby, the judge of charging can be acted based on each characteristics of the battery B, so that the judge accuracy can be more improved.

The above car-mounted information apparatus 10 further includes a voltage value decrease detecting unit 11f detecting decrease of voltage value at the terminal of the battery B when the charge state judge unit 11a judges that the battery B is in charging. When the voltage value decrease detecting unit 11f detects the decrease of voltage value, the control unit 11b controls the radio communication unit 16 to transmit a notification datum for disabling the radio communication between the information management apparatus 20 toward the information management apparatus 20.

According to such car-mounted information apparatus 10, when the voltage value decrease detecting unit 11f detects the decrease of voltage value at the terminal of the battery B in charging, the control unit 11b controls the radio communication unit 16 to transmit the notification datum for disabling the radio communication between the information management apparatus 20 toward the information management apparatus 20. Thereby, the information management apparatus 20 can receive a notification for notifying abnormal state of the battery B in charging, so that the car-mounted information apparatus 10 can be prevented from receiving a data from the information management apparatus 20 when the abnormal state occurs, and useless consumption of electric power can be prevented.

The above car-mounted information apparatus 10 further includes a voltage value decrease detecting unit 11f detecting the decrease of voltage value at the terminal of the battery B when the charge state judge unit 11a judges that the battery B is in charging. When the voltage value decrease detecting unit 11f detects the decrease of voltage value, the control unit 11b controls the radio communication unit 16 to transmit a notification datum for notifying abnormal state of charging the battery B toward the information management apparatus 20.

According to the above car-mounted information apparatus 10, when the voltage value decrease detecting unit 11f detects the decrease of voltage value at the terminal of the battery B, the control unit 11b controls the radio communication unit 16 to transmit the notification datum for notifying abnormal state of charging the battery B toward the information management apparatus 20. Thus, by notifying abnormal state of charging the battery B toward the information management apparatus 20, the information management apparatus 20 can notify the notification datum toward the driver, and a manufacturer, to solve early the abnormal state.

The information transfer system for electric car 1 shown in FIG. 1 includes the above-mentioned car-mounted information apparatus 10 and the information management apparatus 20 arranged outside the electric car. The information management apparatus 20 includes an outside radio communication unit 26 communicating between the radio communication unit 16 of the car-mounted information apparatus 10 by radio and an outside control unit 21 controlling the outside radio communication unit 26 to execute at least one action of receiving updatable data and transmitting the update data between the car-mounted information apparatus 10.

According to such information transfer system for electric car 1, when the battery is charged during the ACC switch of the electric car is in OFF state, radio communication between the car-mounted information apparatus 10 and the predetermined information management apparatus 20 is made available. Then, the car-mounted information apparatus 10 executes at least one action of transmitting the updatable data and receiving the update data for updating the updatable data between outside control unit 21 by radio communication through the outside radio communication unit 26 of the information management apparatus 20.

According to the information transfer system for electric car 1, the car-mounted information apparatus 10 communicates by radio with the information management apparatus arranged outside the electric car during charging the battery by the external electric power without consumption of power of the battery of the electric car and executes at least one action of transmitting the updatable data and receiving the update data for updating the updatable data between the information management apparatus 20 by radio, so that when communicating by radio is acted in many hours, battery depletion of the electric car is securely prevented. The radio communication between the car-mounted information apparatus 10 and the predetermined information management apparatus 20 can be executed by charging the battery B, so that by starting charging the battery B, data transfer can be executed automatically by radio communication. Thus, the updatable data of the car-mounted information apparatus 10 can be shared with the information management apparatus 20 arranged outside the electric car, so that the car-mounted information apparatus 10 can be used more efficiently and usability of the car-mounted information apparatus 10 can be improved. By use of radio communication, only the information management apparatus having ability of radio communication may be provided outside the electric car for this system, and it is not required that specific infrastructure is prepared and built at a usual house, a public facility, so that the present invention can be applied easily.

Embodiment 1: The embodiment 1 of an information transfer system for electric car having the above-mentioned car-mounted information apparatus will be described only about an area related to the present invention with reference to FIGS. 2-9.

Figure 2:
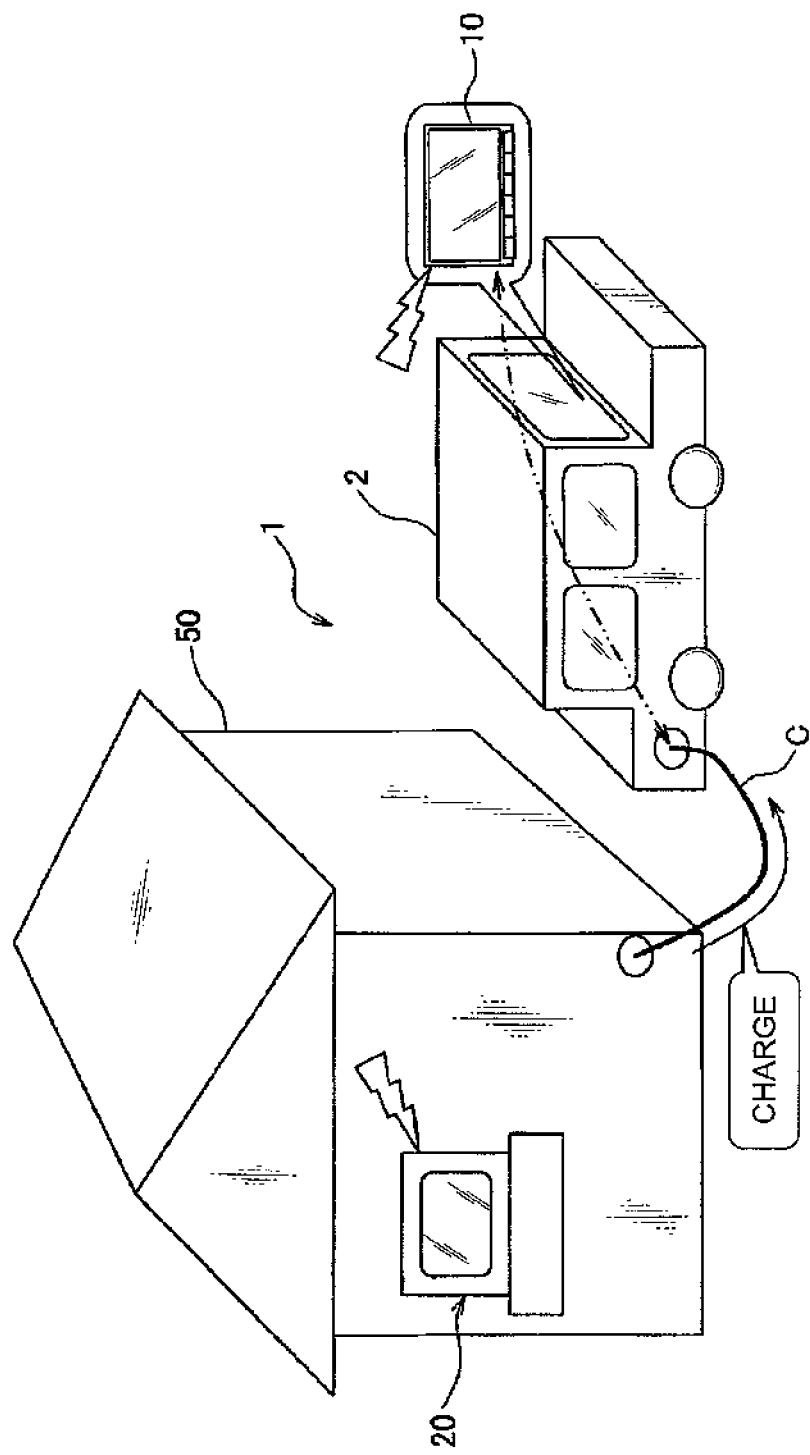
FIG. 2 is an illustration showing an outline of basic structure of the information transfer system for electric car.
Figure 3:
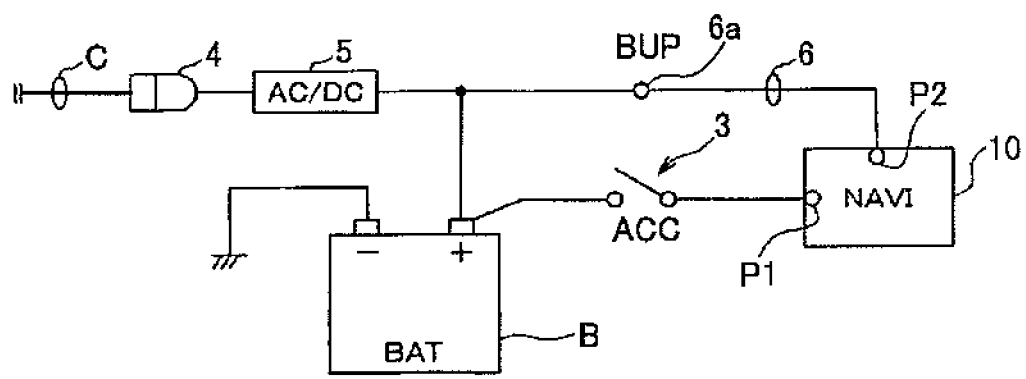
FIG. 3 is a block diagram showing a basic structure at the electric car of the system shown in FIG. 2.

As shown in FIG. 2, the information transfer system for electric car 1 includes a navigation apparatus 10 and the information management apparatus 20 arranged at a user's house 50. In the embodiment, a hybrid car belongs to the electric car 2.

In the embodiment, a case that the navigation apparatus 10 and the information management apparatus are structured to execute two-way communication by radio is described, but one-way communication can be also applied. For radio communication, wireless LAN (Local Area Network), for example Wi-Fi (Wireless Fidelity) connection, and Bluetooth technology can be applied as required. In the other embodiment, the navigation apparatus 10 may be connected by radio communication to a relay point connected with Internet or home LAN system, and communicate through the relay point to the information management apparatus 20.

The navigation apparatus 10 corresponds to the car-mounted information apparatus in claim, which is shown in FIG. 1. An electric power port P1 of the navigation apparatus 10 is connected through an accessory (ACC) switch 3 to a battery B of the electric car 2. An electric power port P2 of the navigation apparatus 10 is electrically connected through a supply line 6 having a BUP terminal 6a to the battery B so as to be structured to have firm electric power supply. The navigation apparatus 10 is acted by the electric power supply through the electric power port P2, triggered by turning the ACC switch ON.

The battery B is charged by the charging electric power through an electric power line C connected to an electric power receiving plug 4 of the electric car 2. An AC/DC converter 5 is arranged between the electric power receiving plug 4 and the battery B. The AC/DC converter 5 converts alternating current from the electric power receiving plug 4 to direct current and output it to the battery B. The AC/DC converter 5 is electrically connected to the supply line 6.

While the battery B is charged by the charging electric power from the electric power receiving plug 4, the navigation apparatus 10 receives a part of the charging electric power through the external electric power port P2, so that the navigation apparatus 10 can be acted even if the ACC is in OFF condition, and the voltage value of the battery B in charging is not decreased. In general navigation apparatus 10, most part of electric power consumption is acted by a power amplifier and a display, so that the electric power required for charging may be smaller than that in normal condition. In other words, the electric power required for charging may be enough to be minimum electric power required for acting the later-described control unit 11 and the radio communication unit 16. Therefore, there is no bad influence to charging the battery B. Thus, when the navigation apparatus 10 receives the electric power from the battery B in charging, the navigation apparatus 10 receives the electric power from the electric power receiving plug 4 of the battery B.

The navigation apparatus 10 is structured to be able to detect a voltage value at a BUP terminal 6a of the backup supply line 6. In other words, the navigation apparatus 10 can judge whether or not the battery B is in charging condition by analyzing the voltage value, change of voltage value, change rate of voltage value, voltage noise pattern at the BUP terminal 6a.

Herein, features of wave form at the BUP terminal 6a is explained. In the electric car 2, a BUP voltage value just after turning the ACC switch to OFF is mostly reduced against a value at charge completion (full charge condition). After the electric power receiving plug 4 is connected, the voltage value rises up toward the value at charge completion.

As a method of judging whether or not in-charging state, it can be applied that process to reach the voltage value about the voltage at charge completion defines in-charging state. By detecting in-charge electric current value and comparing the in-charge electric current value and judge condition determined for the electric car 2, it can be judged that result of comparing corresponds to in-charge electric current. Wave pattern or noise pattern at the BUP terminal 6a generated in charging may be previously detected, so that it can be judged whether or not in charge by comparing actual sampling wave and the detected wave.

The above-mentioned navigation apparatus 10 according to the embodiment is acted by electric power supply through the electric power port P2 from the battery B when the ACC switch 3 of the electric car 2 is turned ON. When the ACC switch 3 is turned OFF, the navigation apparatus 10 receives the required minimum electric power through the electric power port P2 from the battery B.

Figure 4:
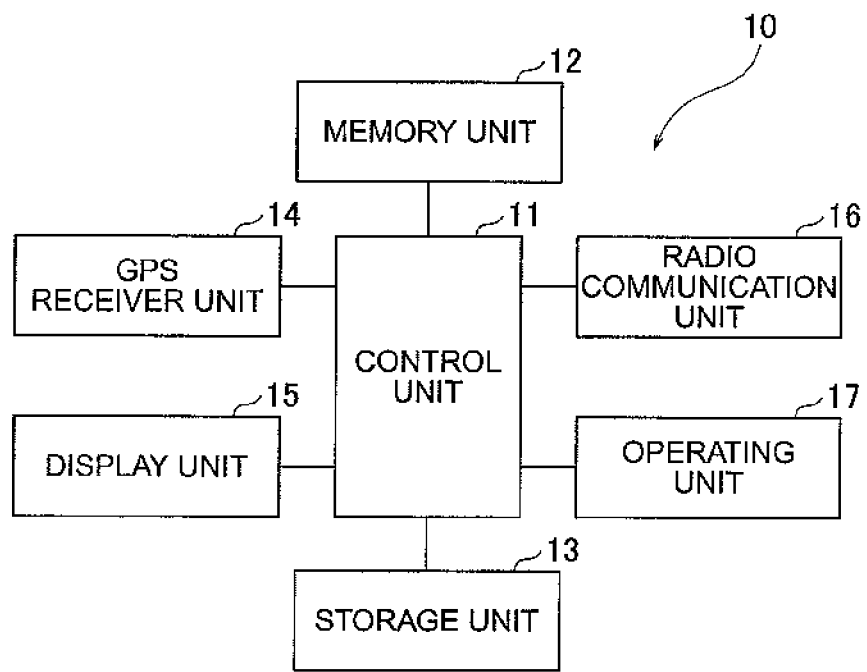
FIG. 4 is a block diagram showing an outline of the navigation apparatus in FIG. 2.

The navigation apparatus 10 includes a control unit 11, a memory unit 12, a storage unit 13, a GPS (Global Positioning System) receiver unit 14, a display unit 15, a radio communication unit 16 and an operation as shown in FIG. 4.

The control unit 11 performs to control the whole of the navigation apparatus 10. Well-known micro-processor (MPU) or DSP (Digital Signal Processer) is applied for the control unit 11. Various programs for functioning the car-mounted information apparatus or the navigation apparatus shown in FIG. 1 are stored in a not-shown internal memory. In detailed, various programs, such as a program for process during ACC-OFF, for making the control unit 11 to function as a charge state judge unit 11a, a control unit 11b, an update unit 11e and a voltage value decrease detecting unit 11f in claim and shown in the above-mentioned FIG. 1 are stored.

For the memory unit 12, various storage media such as a rewritable memory executed by the control unit 11 are applied. The memory unit 12 stores various data, such as distinguishing data of the navigation apparatus 10, various data acquired from the information management apparatus 20, communication address data of the information management apparatus 20 to be communicated, and the like. The distinguishing data is used for authenticating when communicating with the information management apparatus 20. The communication address datum includes an address datum and a telephone number datum of the information management apparatus 20, which is previously registered by the user. In this embodiment, the memory unit 12 performs as a communication address data storage unit D2 shown in FIG. 1.

The memory unit 12 can store previously voltage data such as the BUP voltage value, the BUP voltage change rate, the BUP voltage noise pattern, the GPS coordinates correspondingly to each of the location data, which the information management apparatuses are located, such as the own house, a visiting site, a charging station and the like. The navigation apparatus 10 can monitor and detect the voltage value at the BUP terminal 6a and compare the voltage value with the voltage data, so that the navigation apparatus 10 can judge whether or not the position of detecting is the location which the information management apparatus 20 is located. Thus, data transfer and data updating can be executed at not only own house but also any locations which the user has determined.

As the storage unit 13, a storage media such as a hard disc device and a large capacity memory can be applied suitably. The storage unit 13 stores various map data such as a visiting site map database and a map database having a plurality of map data for displaying a map of any position with a plurality of scales. The storage unit 13 can also storage vehicle data, registered position data, route data, and the like. The vehicle data includes, for example, a fuel level, a charged level, a fuel efficiency and the like. The registered position data includes, for example, a registered position data, which is determined by the user. The route data includes data showing a route toward the visiting site. In the embodiment, an updatable data in claim is described as the map data, so that the storage unit 13 performs as the updatable data storage unit D1 shown in FIG. 1 in claim.

The GPS receiver unit 14, as well-known, receives radio waves radiated from a plurality of artificial satellites structuring a GPS satellite group, and calculates the present position of the GPS receiver unit 14, and outputs position data of the present position through an interface (not shown) to the control unit 11. Then, the control unit 11 stores the inputted position data in time series into the memory unit 12. The position data includes various data such as latitude and longitude indicating the position of the vehicle, which the GPS receiver unit 14 detected, and the date and time of detecting. In the embodiment, a case that the navigation apparatus 10 functions as a car-mounted information apparatus is described. In the other case that a car audio apparatus having no GPS receiver unit 14 functions as the car-mounted information apparatus, position data may be acquired from an outside of the apparatus in the embodiment.

The display unit 15 is arranged at an instrument panel of the electric car 2 so as to be visible from a crew as a driver. As the display unit 15, various display device such as a liquid crystal display element or organic electro luminescence display element can be applied. The display unit 15 displays various data according to a request by the control unit 11.

As the radio communication unit 16, various radio communication devices which can communicate by radio as mentioned can be applied. The radio communication unit 16 is controlled by the control unit 11 so as to perform the radio communication unit in claim and shown in FIG. 1. The radio communication unit 16 transmits various data from the control unit 11 to the information management apparatus 20 and outputs various data received from the information management apparatus 20 to the control unit 11.

The operating unit 17 includes various key switches for inputting instructions of calculation conditions or route setting. In more detail, the operating unit 17 has an arrow-marked key for moving a cursor toward a desired position on the map image shown at the display unit 15, an enter key for inputting confirmation and decision, and a menu select key.

In the navigation apparatus as structured above, the control unit 11 executes the application program having navigating function, so that, as well-known, the control unit 11 calculates the route data toward the visiting site which the user input, and displays the position data detected by the GPS receiver unit 14 and the route data to overlap on the map corresponding to the present position on the display unit 15 for leading the user to the visiting site.

As the information management apparatus 20, a personal computer or an electrical appliance, which can communicate by radio, can be applied suitably as shown in FIG. 2. The present embodiment is described based on the personal computer as the information management apparatus 20. Instead of this, various home electric products such a television receiver or a video game can be applied.

The information management apparatus 20 includes a central processing unit (CPU) 21 controlling whole actions of the apparatus according to a predetermined program, as shown in FIG. 5. To the CPU 21, a ROM 22 which is a read-only memory, and a RAM 23, which is freely rewritable memory, are connected electrically. ROM 22 stores a program for the CPU 21 and outputs the program through a BUS B to the CPU 21. The RAM 23 includes a working area for storing various data required for processing of the CPU 21.

The information management apparatus 20 includes a storage unit 24 electrically connected through the BUS B with the CPU 21. As the storage unit 24, a hard disc device or large capacity memory is suitably used. The storage unit 24 storages data and various program such as a remote operation processing program controlling radio communication for various data between the navigation apparatus 10 and the information management apparatus 20. The storage unit 24 has a save area to save various data received from the above-mentioned navigation apparatus 10. An update data storage area for storing an update data for updating an updatable data of the navigation apparatus 10 is provided in a predetermined area of the storage unit 24. The update data is stored in the update data storage area according to generation of the update data. The update data is structured with a differential data for update and a update program.

The information management apparatus 20 includes an input unit 25, a radio communication unit 26 and a display unit 27, which are electrically connected through the BUS B to the CPU 21. The input unit 25 includes a key board and a mouse, and outputs input data according to operations by the user to the CPU.

As the radio communication unit 26, a radio communication device, which can communicate to the navigation apparatus 10 by radio, is applied and functions an outside radio communication apparatus in claim and as shown in FIG. 1. The radio communication unit 26 outputs received data to the CPU 21 and transmits data inputted from the CPU 21 to an instructed communication address. As the display unit 27, various display devices such as a well-known liquid crystal display and a television receiver are applied. The display unit 27 displays various data according to control of the CPU 21.

One example of data transferred between the navigation apparatus (NAVI) 10 and the information management apparatus (PC) 20 in the above-mentioned information transfer system for electric car 1 is described with reference to FIG. 6.

The update data, which the navigation apparatus 10 receives from the information management apparatus 20, is described (direction of data transfer is toward NAVI). The update data may be generated to have a data structure including any one selected from the group of data for updating to the latest map, registered point data, route plan data, music content data, and image content data.

The updatable data, which the information management apparatus 20 receives from the navigation apparatus 10, is described (direction of data transfer is toward PC). The updatable data may be generated to have a data structure including any one selected from the group of traveling track data, registered point data, route plan data, telephone number data, ETC record data, fuel level data, charged level data, and fuel efficiency data. In this embodiment, a case that the updatable data corresponds to the map data and the update data corresponds to data for updating the map data is explained hereafter.

An example of process during ACC-OFF executed by the control unit 11 of the navigation apparatus 10 when the electric car 2 is in ACC-OFF state will be shown with reference to a flowchart shown in FIG. 7. The control unit 11 is driven in low electric power consumption mode which is an intermittent operation for considering idling current. The processes during ACC-OFF is started according to a change which the ACC switch 3 of the electric car 2 is turned from ON state to OFF state.

In the step S11 shown in FIG. 7, the control unit 11 monitors a BUP wave form which is formed by sampling the voltage values at the BUP terminal 6*a* in time series, and stores a monitored result into the memory unit 12. In the step S12, the control unit 11 judges whether or not the electric car 2 is in charging based on a result of comparing the monitored result in the memory unit 12 and a wave form for comparison corresponding to the battery B which are in similar pattern. In short, the control unit 11 detects change of voltage value or increase of voltage value at the BUP terminal 6*a* while the electric car 2 is in charging and judges in-charge. For example, when the voltage value increases in predetermined period, it is judged that the electric car 2 is in charging, and when the voltage value decreases in the predetermined period, it is judged that the electric car 2 is not in charging. When the control judges that the electric car is not in charging (N in S12), the process returns to the step S11 and the series of processes is repeated until the electric car start to be charged. When the control unit 11 judges that the electric car is in charging (Y in S12), the process is proceeded to the step S13.

In the step S13, the control unit 11 generates a notification datum showing remote operation allowance and a communication address datum (a telephone number, address and the like), and requests the radio communication unit 16 to transmit the notification datum toward the communication address shown in the communication address datum. Thereafter, the process is proceeded to the step S14. According to the processes, the radio communication unit 16 transmits the notification datum to the information management apparatus 20 by radio communication.

In the step S14, the control unit 11 collects data predetermined by the user and generates transfer data based on the collected data, and the process is proceeded to the step S15. The example of collecting data is any data selected by the user from the group of data forming the updatable data shown in FIG. 6. There are various methods for selecting data, for example, items of data to be collected are stored in memory unit 12, and the items are used for reference when collecting data.

In the step S15, the control unit 11 requests the radio communication unit 16 to transmit the transfer data to the communication address shown by the communication address datum, and the process is proceeded to the step S16. According to the process, the radio communication unit 16 transmits the transfer data to the information management apparatus 20 by radio communication. When there is a plurality of communication addresses, the control unit 11 may transmit the data to any from the plurality of communication addresses, or the control unit 11 may transmit the data only to highly prioritized communication addresses as various embodiments.

In the step S16, the control unit 11 judges whether or not the update data is received through the radio communication unit 16 from the information management apparatus 20. When it is judged that the update data is not received (N in S16), the process is proceeded to the step S18. On the other hand, when it is judged that the update data is received (Y in S16), the control unit 11 stores the update data in time series into the memory unit 12, and the process is proceeded to the step S17. In the step S17, the control unit 11 updates the map data in the storage unit 13 as the updatable data according to the update data, and the process is proceeded to the step S18.

Figure 8:
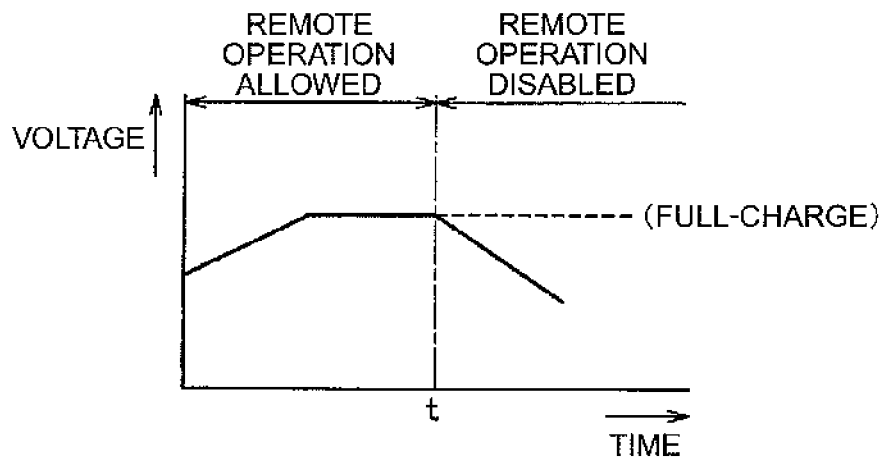
FIG. 8 is a graph showing a relation between voltage values at a BUP terminal connected to an electric power line and a time.

In the step S18, the control unit 11 judges whether or not the voltage value at the BUP terminal 6*a* is decreased. By detecting the decrease of voltage value at the BUP terminal 6*a*, the control unit 11 can judge whether or not the electric power line C is connected to the electric power receiving plug 4 of the electric car 2. When the electric power line C is connected to the electric power receiving plug 4, the voltage value at the BUP terminal 6*a* is increased as shown in FIG. 8. After the battery of the electric car 2 is fully charged, the voltage value at the BUP terminal 6*a* is stabled in constant value. When the electric power line C is disconnected from the electric power receiving plug 4 at time t in FIG. 8, the voltage value at the BUP terminal 6*a* is decreased. By monitoring such change of voltage value at the BUP terminal 6*a*, connection of the electric power line C can be detected. In the embodiment, a case that remote operation is enabled when the electric power line C is connected to the electric power receiving plug 4, and the remote operation is disabled when the electric power line C is disconnected from the electric power receiving plug 4 will be described. A case, that the remote operation is disabled just after the voltage value at the BUP terminal 6*a* is decreased, is described. However, various embodiments can be available, for example, the remote operation is disabled when the voltage value at the BUP terminal 6*a* is decreased to a disabling voltage value lower than the value of full charge.

When it is judged that the voltage value at the BUP terminal 6*a* is not decreased (Y in S18), in the step S19, the control unit 11 generates a notification datum showing allowance of continuous remote operation and communication address datum (a telephone number, address and the like), and requests the radio communication unit 16 to transmit the notification datum toward the communication address indicated by the communication address datum. Thereafter, the process returns to the step S13, and the series of the processes is repeated. According to the process, the radio communication unit 16 transmits the notification datum indicating the disablement of the continuous remote operation to the information management apparatus 20 by radio communication.

When it is judged that the decrease of voltage value exists (N in S18), in the step S20, the control unit 11 generates a notification datum showing disabling the remote operation and prompting to confirm abnormal occurring such as a malfunction in charging operation, and requests the radio communication unit 16 to transmit the notification datum to the communication address shown by the communication address datum, and the process is ended. According to the process, the radio communication unit 16 transmits by radio the notification datum showing disabling the remote operation toward the information management apparatus 20. In this embodiment, when the decrease of voltage value is detected, the process is ended. Instead of this, the process is not ended, and the series of the processes from the step S12 in FIG. 7 is executed until the charging is restated as the other embodiment.

By executing process during ACC-OFF shown in FIG. 7 as mentioned above, the control unit 11 functions as the charge state judge unit 11*a*, the control unit 11*b*, the update unit 11*e*, the voltage value decrease detecting unit 11*f* in claims shown in FIG. 1. The steps S12 in the flowchart shown in FIG. 7 correspond to the charge state judge unit 11*a*, and the step S13-S16 corresponds to the control unit 11*b*, and the step S17 corresponds to the update unit 11*e*, and the step S18 corresponds to the voltage value decrease detecting unit 11*f*.

The process during ACC-OFF mentioned above is explained on the assumption that the processes start according to change of the ACC switch 3 from ON to OFF. Instead of this, various embodiment, for example, starting the process when charging start of the battery B is detected, can be applied.

Explanation of some processes is omitted in the process during ACC-OFF, however, a process responding to a case of possibly wrong judging that the voltage is decreased can be added to the process during ACC-OFF. For example, in an embodiment, it can be defined that it is judged as the decrease of voltage value when the decrease of voltage value during a predetermined period at the BUP terminal 6*a* is detected.

One example of the remote operation process executed by the CPU 21 of the information management apparatus 20 will be described with reference to the flowchart shown in FIG. 9. The remote operation process is started and stopped according to request from the user at the information management apparatus 20.

In the step T31, the CPU 21 judges according to the notification datum received through the radio communication unit 26 whether or not the remote operation is enabled by the navigation apparatus 10. When it is judged that the remote operation is not enabled (N in T31), the control unit 11 repeats this process until the remote operation is enabled. Oppositely, when it is judged that the remote operation is enabled (Y in T31), the process is proceeded to the step T32.

In the step T32, the CPU 21 judges whether or not the update data is stored in the update data storage area of the storage unit 24. When it is judged that the update data is not stored (N in T32), the navigation apparatus 10 is not required to update the update data, so that the process is proceeded to the step T34. When it is judged that the update data is stored (Y in T32), the process is proceeded to the step T33.

In the step T33, the CPU 21 requests the radio communication unit 26 to transmit the update data toward the navigation apparatus 10, which remote operation is enabled according to the communication address of the notification datum, and the process is proceeded to the step T34. According to the process, the radio communication unit 26 transmits the update data toward the navigation apparatus 10 by radio communication.

In the step T34, the CPU 21 judges whether or not the transfer data is received through the radio communication unit 26 from the navigation apparatus 10. When it is judged that the transfer data is not received (N in T34), the process is proceeded to the step T36. Oppositely, when it is judged that the transfer data is received (Y in T34), the transfer data received in the step T35 is stored in time series in the save are of the storage unit 24, and the process is proceeded to the step T36.

In the step T36, the CPU 21 judges whether or not the remote operation is disabled by the navigation apparatus 10 according to the notification datum received through the radio communication unit 26. When the CPU 21 judges that the remote operation is not disabled (N in T36), the process returns to the step T32 and series of the processes is repeated. Oppositely, when the CPU 21 judges that the remote operation is disabled (Y in T36), the process returns to the step T31, and series of the processes is repeated.

Figure 9:
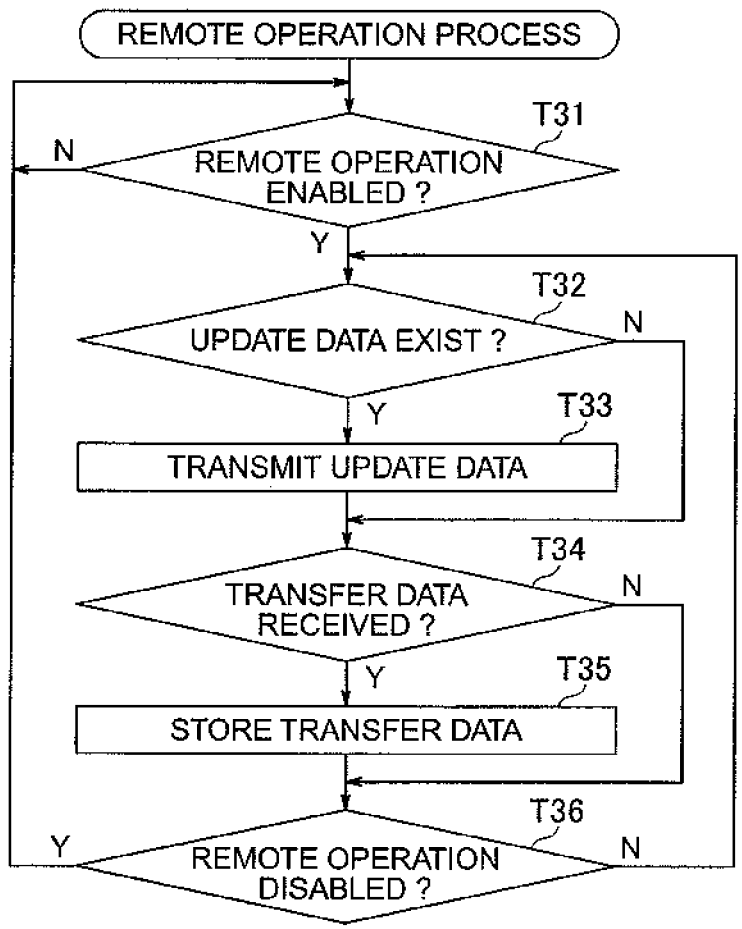
FIG. 9 is a flowchart showing an example of a remote action process executed by a CPU of the information management apparatus in FIG. 5.

By executing the remote operation process shown in FIG. 9, the CPU 21 functions the outside communication control unit in claim shown in FIG. 1. The steps T33, T34 in the flowchart shown in FIG. 8 correspond to the outside control unit.

One example of operations (actions) of the navigation apparatus 10 and the information management apparatus 20 in the information transfer system for electric car 1.

After the user comes home and turns the ACC switch 3 to OFF, the navigation apparatus 10 monitors charge state of the electric car 2 based on the voltage value and the change of voltage value at the BUP terminal 6*a*. The user operates the information management apparatus 20 arranged at the user house 50 to start the remote operation processing program so as to set the information management apparatus 20 in standby state. The information management apparatus 20 can be normally in standby state. After that, the electric power line C is connected to the electric power receiving plug 4 of the electric car 2. Thereby, charging of the electric car 2 is started, and the voltage value at the BUP terminal 6*a* is changed.

When the charging of the electric car 2 is detected, the navigation apparatus 10 transmit the notification datum for enabling the remote operation and the transfer data toward the information management apparatus 20 by radio communication. The information management apparatus 20 receives the notification datum for enabling the remote operation from the navigation apparatus 10, and when the storage unit 24 stores the update data for updating the map data, transmits the update data to the navigation apparatus 10 by radio communication. Thereby, the navigation apparatus 10 updates the map data stored in the storage unit 13 according to the received update data.

On the other hand, when the transfer data from the navigation apparatus 10 is received, the information management apparatus 20 stores the transfer data in time series into the save area of the storage unit 24. When the information management apparatus 20 receives a request of displaying the transfer data from the user, the information management apparatus 20 displays the transfer data at the display unit 27. When the information management apparatus 20 receives a request of transferring transfer data from the user, the information management apparatus 20 transfers transfer data to a transfer address by the radio communication unit 26 or a not-shown LAN card.

When the navigation apparatus 10 detects the decrease of voltage value at the BUP terminal 6*a* of the electric car 2, the navigation apparatus transmits the notification datum to disable the remote operation and prompt to confirm a charge operation toward the information management apparatus 20 by radio communication. When the information management apparatus 20 receives the notification datum from the navigation apparatus 10, the information management apparatus 20 prompts a user to confirm the charge operation and is set in standby state. In other embodiment, the information management apparatus 20 may notify a completion of charging the electric car 2 to the user according to receiving the notification datum.

According o the above-mentioned navigation apparatus 10, when radio communication between the information management apparatus 20 is executed during the ACC switch 3 of the electric car 2 is in OFF state, the operation is acted during the battery B is in charging, so that electric power consumption of the battery B can be prevented or held to a minimum, and even if communicating by radio is acted in many hours, battery depletion of the electric car can be securely prevented. Only by starting charging the electric car 2 after turning the ACC switch 3 to OFF, the car-mounted information apparatus 10 can execute updating the updatable data and backup of data automatically without a driver staying in the electric car 2. Thus, the car-mounted information apparatus 10 can share the updatable data with the information management apparatus 20 arranged outside the electric car 2, so that the car-mounted information apparatus 10 can be used more effectively and usability of the car-mounted information apparatus 10 can be improved. By use of radio communication, only the information management apparatus 20 having ability of radio communication may be provided outside the electric car 2 for this system, and it is not required that specific infrastructure is prepared and built at a usual house, a public facility, so that the present invention can be applied easily.

When the navigation apparatus 10 receives the update data from the information management apparatus 20, the navigation apparatus 10 updates the updatable data at the memory unit 12 based on the received update data. Thereby, time for updating the updatable data is added to the time for transfer data. The operation by the control unit 11 is executed during the battery B is in charging, so that the battery B of the electric car 2 is not consumed, and battery depletion of the electric car 2 can be securely prevented during updating the updatable data. Thus, usability of the car-mounted information apparatus 10 can be more improved.

According to the navigation apparatus 10, when the control unit 11 analyzes the change of voltage value at the BUP terminal 6a of the battery B and judges that the battery B is in charging based on result of analyzing, the navigation apparatus 10 enable the radio communication unit 16 to communicate by radio between the predetermined information management apparatus 20. Therefore, it can be judged based on each own feature of the battery B whether or not the battery is in charging, so that judge accuracy can be more improved.

In the above-mentioned embodiment, the case that the navigation apparatus 10 communicates by radio with the information management apparatus 20 at the user house 50 is explained. Instead of this, the information management apparatus 20 may be arranged at a visiting site, a charge station, an accommodation or a public facility, so that the navigation apparatus 10 can acquire local data or area traffic data from the information management apparatus 20 of a third party during charging the electric car 2.

In the above-mentioned embodiment, the case that the navigation apparatus 10 executes as the car-mounted information apparatus according to the present invention is explained. The present invention does not limit this, and an apparatus having radio communication ability, such as a car audio apparatus, an ETC car-mounted apparatus or a mobile terminal apparatus, can be applied as the car-mounted information apparatus.

Embodiment 2: The embodiment 2 of an information transfer system for electric car having the above-mentioned car-mounted information apparatus will be described only about an area related to the present invention with reference to above-mentioned figures and FIG. 10.

The above-mentioned embodiment 1; in which the navigation apparatus 10 judges whether or not the battery is in charging based on the wave form at the BUP terminal 6a of the battery B after the ACC switch is turned OFF, and when it is judged that the battery is in charging, radio communication is acted; is described. When in charging, noises are actually overlapped on the wave form at the BUP terminal 6a, so that it may not be securely judged whether or not in charging based on the wave form. The embodiment 2 which can solve such problem will be described. For simplifying the description, it is assumed that basic structure of the navigation apparatus 10 is the same as that of embodiment 1 and description for that is omitted.

The information transfer system for electric car 1 according to embodiment 2 includes the navigation apparatus 10 and the information management apparatus 20 as shown in FIG. 1. The navigation apparatus 10, as shown in FIG. 4, includes the control unit 11, the memory unit 12, the storage unit 13, the GPS (global positioning system) receiver unit 14, the display unit 15, the radio communication unit 16 and the operation unit 17.

The control unit 11 stores various programs for functioning the above-mentioned car-mounted information apparatus 10 shown in FIG. 1 in a not-shown internal memory. In detailed, various programs, such as a program 2 for process during ACC-OFF, for making the control unit 11 to function as the charge state judge unit 11a, the control unit 11b, a present position data acquiring unit 11c, present position judge unit 11d, the update unit 11e and a voltage value decrease detecting unit 11f in claim and shown in the above-mentioned FIG. 1 are stored.

The memory unit 12 stores the above-mentioned distinguishing data and communication address data, furthermore radio communicatable position data showing radio communicatable position between the information management apparatus 20. The radio communicatable position data include position data previously registered by the user. When plural radio communicatable positions are registered by the user, one or plural radio communicatable position data are generated corresponding to number of registered positions and stored in the memory unit 12. When enabling that the plural radio communicatable positions are registered and arranged, prioritized order can be applied to the plural radio communicatable positions, or ON-OFF function for each of the radio communicatable positions can be arranged for various embodiments having selectable radio communication. In this embodiment, a case that the radio communicatable position corresponds to a position in which the information management apparatus 20 is located is described. Instead of this, a charging station of the electric car 2 or public facility is arranged as the radio communicatable position, so that it is not required that a charge unit for the electric car 2 is provided at the position in which the information management apparatus 20 is located.

The information management apparatus 20 has the same structure as shown in FIG. 5, and includes the central processor unit (CPU) 21, the ROM 22, the RAM 23, the storage unit 24, the input unit 25, the radio communication unit 26 and the display unit 27.

when the electric car 2 is in ACC-OFF sate, an example of the process during ACC-OFF executed by the control unit 11 of the navigation apparatus 10 according to the embodiment 2 will be described with reference to a flowchart shown in FIG. 10. The control unit 11 is acted by low electric power consumption mode as intermittent operation by considering increase of idling current. The process during ACC-OFF is started by change of the ACC switch 3 of the electric car 2 turning from ON state to OFF state.

Figure 10:
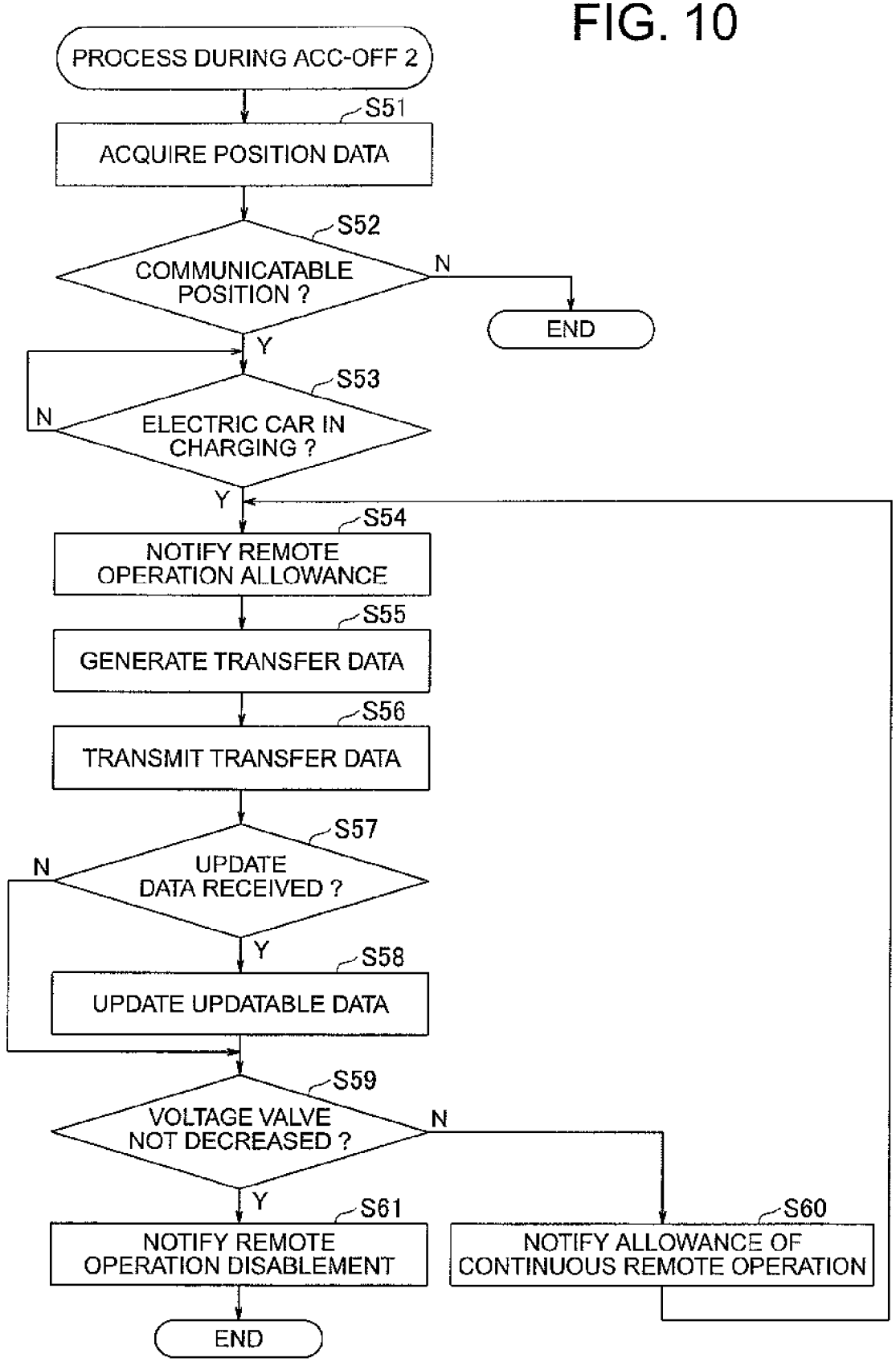
FIG. 10 is a flowchart showing the other example of the processes during ACC-Off 2 executed by the control unit of the navigation apparatus shown in FIG. 4.

In the step S51 shown in FIG. 10, the control unit 11 acquires the present position data detected by the GPS receiver unit 14 and stores the data in the memory unit 12. In the step S52, the control unit 11 compares the present position data and the radio communicatable position data stored in the memory unit 12, and judges whether or not the position, in which the previously registered information management apparatus 20 is located, is near to the radio communicatable position. When the control unit 11 judges that it is not the radio communicatable position (N in S52), the process is ended and the operation is stopped and the updatable data is not updated. Thus, according to the embodiment 2, when it is judges that it is not the radio communicatable position, shifting to low electric power consumption mode is not required, and no operation is acted until the ACC switch 3 is turned ON.

Oppositely, when it is judged that it is the communicatable position (Y in S52), the process is proceeded to the step S53.

In the step S53, the control unit 11 monitors the BUP wave form by sampling the voltage value at the BUP terminal 6a intermittently in time series and compares the monitored data with the comparing wave from corresponding to the battery B about similarity. Thereby, the control unit 11 judges based on the result of comparing whether or not the electric car 2 is in charging. When it is judged that it is not in charging (N in S53), the control unit 11 repeats this process for judging until charging of the battery B is started. On the other hand, when it is judged that it is in charging (Y in S53), the process is proceeded to the step S54.

In the step S54, the control unit 11 generates a notification datum showing remote operation allowance and a communication address datum (a telephone number, address and the like), and requests the radio communication unit 16 to transmit the notification datum toward the communication address shown in the communication address datum. Thereafter, the process is proceeded to the step S55. According to the processes, the radio communication unit 16 transmits the notification datum to the information management apparatus 20 by radio communication.

In the step S55, the control unit 11 collects data predetermined by the user and generates transfer data based on the collected data, and the process is proceeded to the step S56. The example of collecting data is any data selected by the user from the group of data forming the updatable data shown in FIG. 6.

In the step S56, the control unit 11 requests the radio communication unit 16 to transmit the transfer data to the communication address shown by the communication address datum, and the process is proceeded to the step S57. According to the process, the radio communication unit 16 transmits the transfer data to the information management apparatus 20 by radio communication. When there is a plurality of communication addresses, the control unit 11 may transmit the data to any from the plurality of communication addresses, or the control unit 11 may transmit the data only to highly prioritized communication addresses as various embodiments.

In the step S57, the control unit 11 judges whether or not the update data is received through the radio communication unit 16 from the information management apparatus 20. When it is judged that the update data is not received (N in S57), the process is proceeded to the step S18. On the other hand, when it is judged that the update data is received (Y in S57), the control unit 11 stores the update data in time series into the memory unit 12, and the process is proceeded to the step S58. In the step S58, the control unit 11 updates the map data in the storage unit 13 as the updatable data according to the update data, and the process is proceeded to the step S59.

When it is judged that the voltage value at the BUP terminal 6a is not decreased (Y in S59), in the step S60, the control unit 11 generates a notification datum showing allowance of continuous remote operation and communication address datum (a telephone number, address and the like), and requests the radio communication unit 16 to transmit the notification datum toward the communication address indicated by the communication address datum. Thereafter, the process returns to the step S54, and the series of the processes is repeated. According to the process, the radio communication unit 16 transmits the notification datum indicating the disablement of the continuous remote operation to the information management apparatus 20 by radio communication.

When it is judged that the decrease of voltage value exists (N in S59), in the step S61, the control unit 11 generates a notification data showing disabling the remote operation and prompting to confirm abnormal occurring such as a malfunction in charging operation, and requests the radio communication unit 16 to transmit the notification datum to the communication address shown by the communication address datum, and the process is ended. According to the process, the radio communication unit 16 transmits by radio the notification datum showing disabling the remote operation toward the information management apparatus 20. In this embodiment, when the decrease of voltage value is detected, the process is ended. Instead of this, the process is not ended, and the series of the processes from the step S53 in FIG. 10 is executed until the charging is restated as the other embodiment.

By executing process during ACC-OFF shown in FIG. 10 as mentioned above, the control unit 11 functions as the charge state judge unit 11a, the control unit 11b, the present position data acquiring unit 11c, the present position judge unit 11d, the update unit 11e, the voltage value decrease detecting unit 11f in claims shown in FIG. 1. The steps S53 in the flowchart shown in FIG. 10 correspond to the charge state judge unit 11a, and the step S54-S57 corresponds to the control unit 11b, and the step S51 corresponds to the present position data acquiring unit 11c, and the step S52 corresponds to the present position judge unit 11d, the step S58 corresponds to the update unit 11e, and the step S59 corresponds to the voltage value decrease detecting unit 11f.

One example of operations (actions) of the navigation apparatus 10 and the information management apparatus 20 in the information transfer system for electric car 1.

After the user comes home and turns the ACC switch 3 to OFF, the navigation apparatus 10 acquires a present position datum, which is detected by the GPS receiver unit 14, compares the present position data and the radio communicatable position. When it is judged that the present position is not the radio communicatable position, the navigation apparatus 10 does not update the updatable data, and ends the operation.

When it is judged that the present position is the radio communicatable position, the navigation apparatus 10 is shifted to monitoring mode operation so as to monitor charging of the electric car 2 based in the voltage value and the change of voltage value at the BUP terminal 6a by intermittent operation for updating the updatable data. The user executes the remote operation processing program in the information management apparatus 20 arranged at the user house 50 and sets the information management apparatus 20 in standby condition. The information management apparatus 20 can be also set in continuous standby condition. Thereafter, the user connects the electric power line C to the electric power receiving plug 4 of the information management apparatus 20. Thereby, charging the electric car 2 is started and the voltage value at the BUP terminal 6a is changed to increase.

When the charging of the electric car 2 is detected, the navigation apparatus 10 transmit the notification datum for enabling the remote operation and the transfer data toward the information management apparatus 20 by radio communication. The information management apparatus 20 receives the notification datum for enabling the remote operation from the navigation apparatus 10, and when the storage unit 24 stores the update data for updating the map data, transmits the update data to the navigation apparatus 10 by radio communication. Thereby, the navigation apparatus 10 updates the map data stored in the storage unit 13 according to the received update data.

On the other hand, when the transfer data from the navigation apparatus 10 is received, the information management apparatus 20 stores the transfer data in time series into the save area of the storage unit 24. When the information management apparatus 20 receives a request of displaying the transfer data from the user, the information management apparatus 20 displays the transfer data at the display unit 27. When the information management apparatus 20 receives a request of transferring transfer data from the user, the information management apparatus 20 transfers the transfer data to a transfer address by the radio communication unit 26 or a not-shown LAN card.

When the navigation apparatus 10 detects the decrease of voltage value at the BUP terminal 6a of the electric car 2, the navigation apparatus transmits the notification datum to disable the remote operation and prompt to confirm a charge operation toward the information management apparatus 20 by radio communication. When the information management apparatus 20 receives the notification datum from the navigation apparatus 10, the information management apparatus 20 prompts a user to confirm the charge operation and is set in standby state. In other embodiment, the information management apparatus 20 may notify a completion of charging the electric car 2 to the user according to receiving the notification datum.

According o the above-mentioned navigation apparatus 10, when radio communication between the information management apparatus 20 is executed during the ACC switch 3 of the electric car 2 is in OFF state, the operation is acted during the battery B is in charging, so that electric power consumption of the battery B can be prevented or held to a minimum, and even if communicating by radio is acted in many hours, battery depletion of the electric car can be securely prevented. Only by starting charging the electric car 2 after turning the ACC switch 3 to OFF, the car-mounted information apparatus 10 can execute updating the updatable data and backup of data automatically without a driver staying in the electric car 2. Thus, the car-mounted information apparatus 10 can share the updatable data with the information management apparatus 20 arranged outside the electric car 2, so that the car-mounted information apparatus 10 can be used more effectively and usability of the car-mounted information apparatus 10 can be improved. By use of radio communication, only the information management apparatus 20 having ability of radio communication may be provided outside the electric car 2 for this system, and it is not required that specific infrastructure is prepared and built at a usual house, a public facility, so that the present invention can be applied easily.

According to the car-mounted information apparatus 10, by adding a condition that the position is the radio communicatable position with the information management apparatus 20 as a judging condition during charging so as to combine conditions of radio communicatable position and in charging, accuracy of judging whether or not the car-mounted information apparatus 10 is in charging can be improved. When it is judged whether or not the car-mounted information apparatus 10 is in charging based on the voltage value at the BUP terminal 6a, the external electric power supply is limited at the radio communicatable position in which electric power can be supplied stably. Thereby, accuracy of judging whether or not the car-mounted information apparatus 10 is in charging can be more improved. Furthermore, when the present position is not the radio communicatable position, the automatic update is not executed, and only when the present position is the radio communicatable position, the automatic update is executed. Thereby, even if the battery B can be charged often, frequent updating can be prevented. Thus, accuracy of judging whether or not the car-mount information apparatus is in charging is improved, so that the battery depletion of the electric car by updating data can be more securely prevented.

When the navigation apparatus 10 receives the update data from the information management apparatus 20, the navigation apparatus 10 updates the updatable data at the memory unit 12 based on the received update data. Thereby, time for updating the updatable data is added to the time for transfer data. The operation by the control unit 11 is executed during the battery B is in charging, so that the battery B of the electric car 2 is not consumed, and battery depletion of the electric car 2 can be securely prevented during updating the updatable data. Thus, usability of the car-mounted information apparatus 10 can be more improved.

According to the navigation apparatus 10, when the control unit 11 analyzes the change of voltage value at the BUP terminal 6a of the battery B and judges that the battery B is in charging based on result of analyzing, the navigation apparatus 10 enable the radio communication unit 16 to communicate by radio between the predetermined information management apparatus 20. Therefore, it can be judged based on each own feature of the battery B whether or not the battery is in charging, so that judge accuracy can be more improved.

In the above mentioned embodiments 1 and 2, the case that the battery B of the electric car 2 is charged through the electric power line C connected to the electric power receiving plug 4 is described. The present invention is not limited to this, and the battery may be charged by non-contact electric power supply as the other embodiment. The example will be described hereafter.

Figure 11:
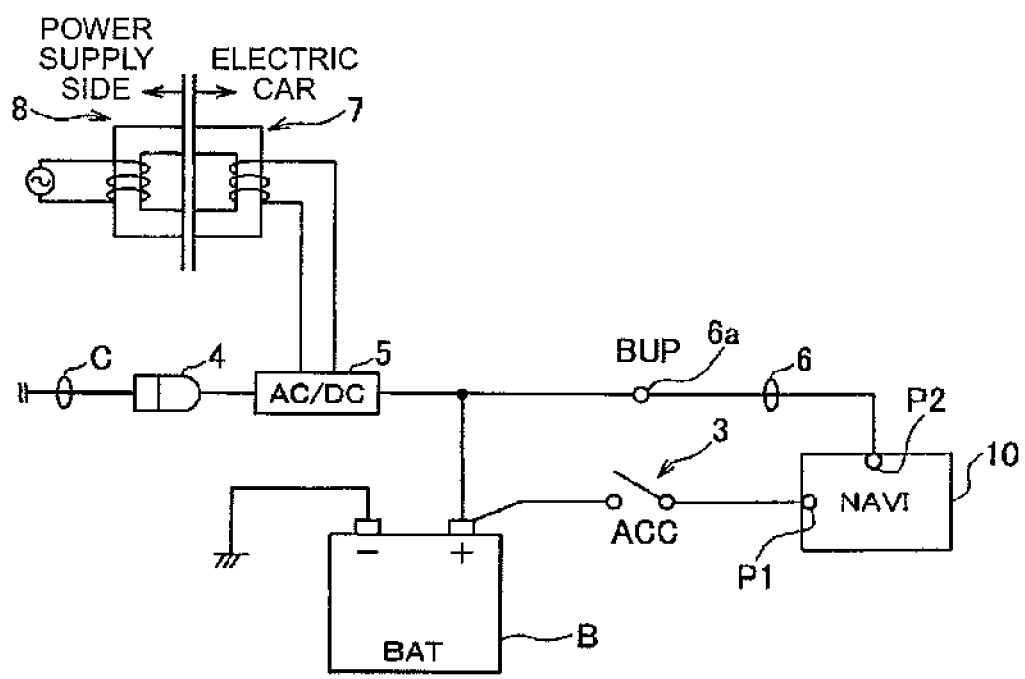
FIG. 11 is a block diagram showing the other example of the electric car shown in FIG. 2.

In FIG. 11, the electric car 2 includes a secondary coil 7 in addition to the above structure. The secondary coil 7 is arranged at a car body of the electric car 2 so as to face to a primary coil 8 which is arranged at an electric power supply station. The secondary coil 7 includes a ferrite core and a spiral coil wound around the ferrite core. Electric current from commercial electric power supply flows into the primary coil flows so as to generate magnetic flux change, so that electromotive force is generated in the secondary coil 7 and electric current flows through the secondary coil 7. Thus, by the magnetic flux change, energy is transferred from the primary coil 8 to the secondary coil 7 by noncontact way.

The secondary coil 7 is electrically connected to the AC/DC converter 5, and the electric current generated by magnetic flux change flows to the AC/DC converter 5. In FIG. 11, the AC/DC converter 5 is structured to supply electric power from the secondary coil 7 and electric power from the electric power receiving plug 4 toward the battery B. It may be structured that the AC/CD converter is electrically connected only to the secondary coil 7. Thus, when the battery B can be frequently charged at the electric power supply station, the updatable data at the navigation apparatus 10 can be frequently updated at many radio communicatable positions, so that usability of the navigation apparatus 10 can be improved and the updatable data can be maintained always as the newest.

While, in the embodiment, the present invention is described, it is not limited thereto. Various change and modifications can be made with the scope of the present invention.

The invention claimed is:
1. A car-mounted information apparatus acted by electric power supplied from a battery of an electric car, which the battery is charged when an accessory switch of the electric car is in an OFF state, comprising:

an updatable data storage unit storing updatable data;
a communication address data storage unit storing a communication address datum corresponding a predetermined information management apparatus arranged outside the electric car;
a charge state judge unit judging whether or not the battery is in charging when an accessory switch of the electric car is in OFF state;
a radio communication unit communicating between the information management apparatus, to which the communication address datum corresponds, by the electric power supplied from the battery in charging; and
a control unit controlling the radio communication unit to execute at least one action of transmitting the updatable data and receiving update data for updating the updatable data between the information management apparatus when the charge state judge unit judges that the battery is in charging;
an update unit acted by the electric power from the battery in charging, and updating the updatable data according to the update data received by the radio communication unit; and
a voltage value decrease detecting unit detecting decrease of voltage value at the terminal of the battery when the charge state judge unit judges that the battery is in charging,
wherein the charge state judge unit analyzes change of voltage value at a terminal of the battery, and judges whether or not the battery is in charging based on an analyzed result, wherein the radio communication unit is enabled to communicate by radio between the information management apparatus shown by the communication address datum, according to judging, which is judged by the charge state judge unit that the battery is in charging,
wherein the control unit controls the radio communication unit to transmit a notification datum for disabling radio communication between the information management apparatus toward the information management apparatus when the decrease of voltage value is detected by the voltage value decrease detecting unit.

2. The car-mounted information apparatus according to claim 1, further comprising:
a present position data acquiring unit acquiring a present position data of the electric car; and
a present position judge unit judging whether or not the present position data acquired by the present position data acquiring unit corresponds to a radio communicatable position which is communicatable between the information management apparatus,
wherein the charge state judge unit judges whether or not the battery is in charging when it is judged that the present position data corresponds to the radio communicatable position.

3. An information transfer system for electric car comprising:
the car-mounted information apparatus according to claim 1; and
an information management apparatus arranged outside the electric car,
wherein the information management apparatus comprises:
an outside radio communication unit communicating between the radio communication unit of the car-mounted information apparatus; and
an outside control unit controlling the outside radio communication unit to execute at least one action of receiving the updatable data and transmitting the update data between the car-mounted information apparatus.

4. A car-mounted information apparatus acted by electric power supplied from a battery of an electric car, which the battery is charged when an accessory switch of the electric car is in an OFF state, comprising:
an updatable data storage unit storing updatable data;
a communication address data storage unit storing a communication address datum corresponding a predetermined information management apparatus arranged outside the electric car;
a charge state judge unit judging whether or not the battery is in charging when an accessory switch of the electric car is in OFF state;
a radio communication unit communicating between the information management apparatus, to which the communication address datum corresponds, by the electric power supplied from the battery in charging;
a control unit controlling the radio communication unit to execute at least one action of transmitting the updatable data and receiving update data for updating the updatable data between the information management apparatus when the charge state judge unit judges that the battery is in charging;
an update unit acted by the electric power from the battery in charging, and updating the updatable data according to the update data received by the radio communication unit; and
a voltage value decrease detecting unit detecting decrease of voltage value at the terminal of the battery while the charge state judge unit judges that the battery is in charging,
wherein the charge state judge unit analyzes change of voltage value at a terminal of the battery, and judges whether or not the battery is in charging based on an analyzed result, wherein the radio communication unit is enabled to communicate by radio between the information management apparatus shown by the communication address datum, according to judging, which is judged by the charge state judge unit that the battery is in charging,
wherein the control unit controls the radio communication unit to transmit a notification datum notifying an abnormal state of charging the battery B toward the information management apparatus when the decrease of voltage value at the terminal is detected by the voltage value decrease detecting unit.

5. The car-mounted information apparatus according to claim 4, further comprising:
a present position data acquiring unit acquiring a present position data of the electric car; and
a present position judge unit judging whether or not the present position data acquired by the present position data acquiring unit corresponds to a radio communicatable position which is communicatable between the information management apparatus,
wherein the charge state judge unit judges whether or not the battery is in charging when it is judged that the present position data corresponds to the radio communicatable position.

6. An information transfer system for electric car comprising:
the car-mounted information apparatus according to claim 4; and
an information management apparatus arranged outside the electric car, wherein the information management apparatus comprises:
an outside radio communication unit communicating between the radio communication unit of the car-mounted information apparatus; and
an outside control unit controlling the outside radio communication unit to execute at least one action of receiving the updatable data and transmitting the update data between the car-mounted information apparatus.

* * * * *